United States Patent
Bombardi et al.

(10) Patent No.: US 6,776,705 B2
(45) Date of Patent: Aug. 17, 2004

(54) APPARATUS AND A METHOD FOR SUPPLYING CONDITIONED AIR TO AN AIRCRAFT

(75) Inventors: Harry G. Bombardi, Beavercreek, OH (US); Danny L. Lyons, Jamestown, OH (US)

(73) Assignee: Boom Air, L.L.C., Beavercreek, OH (US)

( * ) Notice: Subject to any disclaimer, the term of this patent is extended or adjusted under 35 U.S.C. 154(b) by 54 days.

(21) Appl. No.: 10/230,797

(22) Filed: Aug. 29, 2002

(65) Prior Publication Data

US 2002/0195156 A1 Dec. 26, 2002

Related U.S. Application Data

(63) Continuation-in-part of application No. 09/799,144, filed on Mar. 5, 2001.

(51) Int. Cl.[7] .................................................. B60H 1/00
(52) U.S. Cl. ..................... 454/119; 454/76; 137/355.16
(58) Field of Search .............................. 454/71, 73, 76, 454/119; 137/355.16, 355.12, 899.1, 899.3; 248/49

(56) References Cited

U.S. PATENT DOCUMENTS

| | | | | |
|---|---|---|---|---|
| 2,599,423 A | | 6/1952 | Ziegler | |
| 3,521,316 A | * | 7/1970 | Adams et al. | 14/71.5 |
| 3,792,189 A | * | 2/1974 | Stengel et al. | 174/69 |
| 4,266,744 A | * | 5/1981 | Bergman | 248/49 |
| 4,357,860 A | * | 11/1982 | Krzak | 454/71 |
| 4,534,384 A | | 8/1985 | Graham et al. | |
| 4,620,339 A | * | 11/1986 | Shepheard | 14/71.5 |
| 4,655,399 A | | 4/1987 | Harvey | 239/745 |
| 4,715,077 A | * | 12/1987 | Shepheard | 14/71.5 |
| 5,740,846 A | * | 4/1998 | Larson et al. | 141/382 |
| 6,182,721 B1 | * | 2/2001 | Gregoryk | 141/384 |

FOREIGN PATENT DOCUMENTS

| | | |
|---|---|---|
| DE | 2615827 | 10/1977 |
| DE | 4442513 | 8/1995 |
| EP | 0 446 653 A1 | 8/2001 |
| EP | 1184279 A1 | 8/2001 |
| GB | 1166842 | 10/1969 |
| GB | 2199304 | 7/1988 |
| GB | 2308840 A | 11/1995 |
| JP | 2140545 | 5/1990 |

* cited by examiner

*Primary Examiner*—Derek Boles
(74) *Attorney, Agent, or Firm*—Patents+TMS, P.C.

(57) ABSTRACT

The present invention generally relates to a device and a method for supplying conditioned air for heating and/or cooling from a first environment to a second environment. More specifically, the present invention provides a hose in a container and a retractor. The retractor may have a drive unit with a belt. Protrusions on the hose may correspond with grooves on the belt. The belt of the drive unit may engage the hose and pull the hose from the container. In addition, the drive unit may also retract the hose into the container when the hose is not needed. Further, a linear actuator may release the retractor from the hose allowing the hose to be pulled manually from the container.

8 Claims, 4 Drawing Sheets

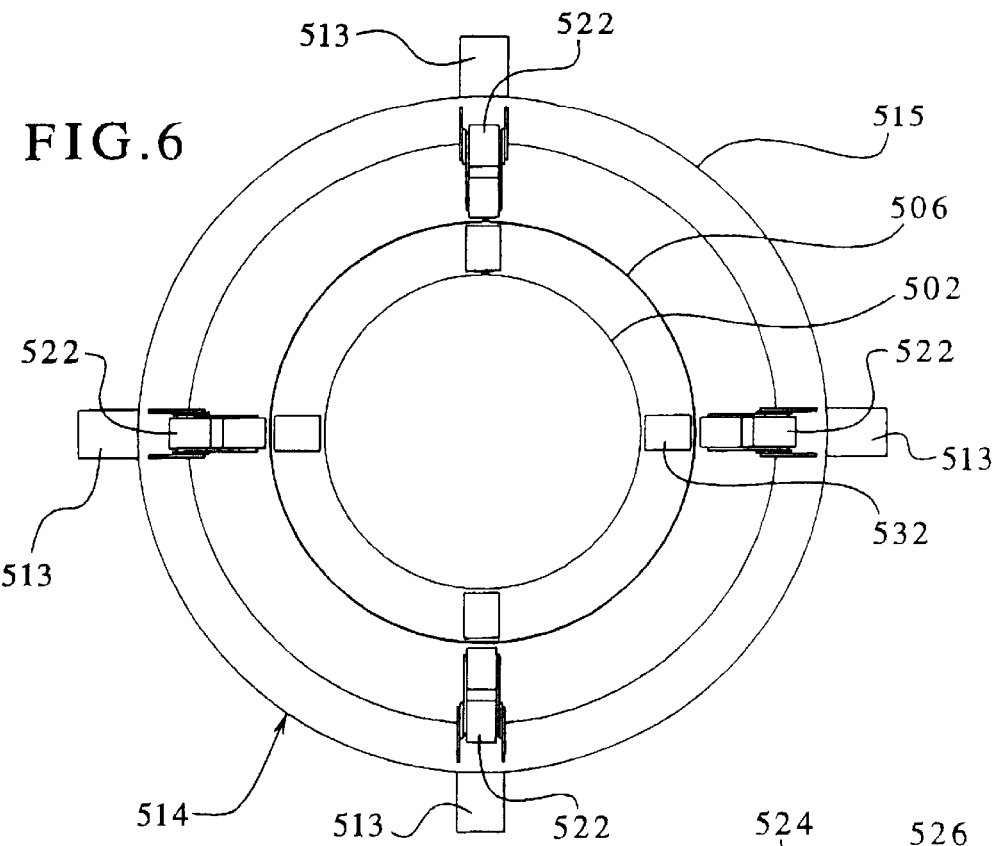
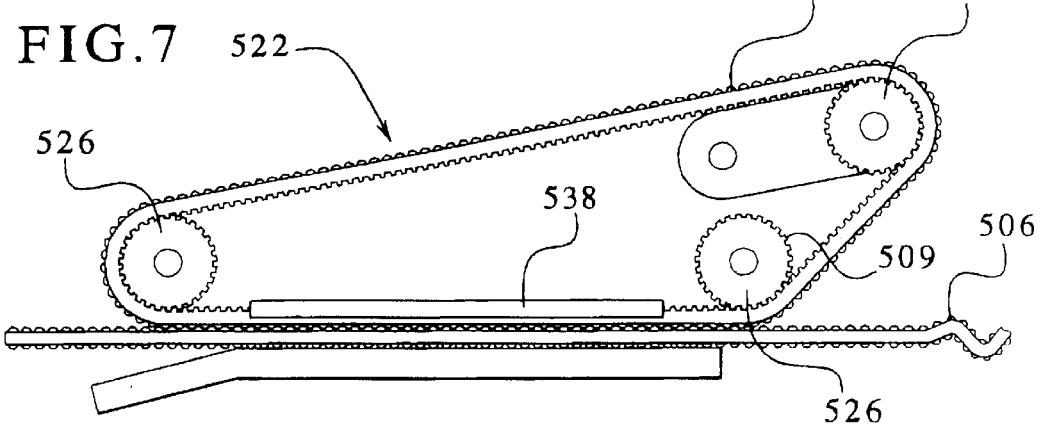
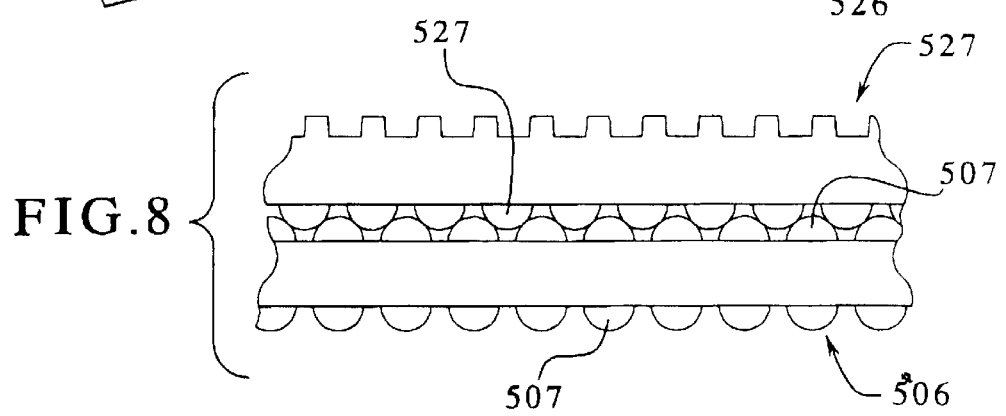

APPARATUS AND A METHOD FOR SUPPLYING CONDITIONED AIR TO AN AIRCRAFT

This application is a Continuation-In-Part Application of co-pending U.S. patent application Ser. No. 09/799,144 filed on Mar. 5, 2001.

BACKGROUND OF THE INVENTION

The present invention generally relates to a device and a method for supplying conditioned air for heating and cooling to an aircraft. More specifically, the present invention provides a supply hose in a protected container. The container may deliver the required length of hose to the aircraft and retract the hose when the hose is not needed.

It is, of course, generally known to supply commercial aircraft with conditioned air for heating and cooling. Typically, conditioned air is supplied to the aircraft from a jetway. The air is delivered with a flexible air hose. The supply hose is typically seventy feet in length. When not in use, the supply hose is stored in a bin under the jetway. Occasionally, when time permits, a worker may roll the hose into a wound roll before storing the hose in the bin. Often, an individual leaves the hose in a pile in the bin, thereby increasing undue wear of the hose and significantly affecting the performance of the hose when in use.

In addition, while all aircraft have a standard connector, this connector is not located at the same point on all aircraft. Further, the jetway is not always located at the same distance from the aircraft. Some aircraft require seventy feet of supply hose for the conditioned air to reach the aircraft from the jetway while others may only require twenty feet. All seventy feet of the supply hose must be removed from the bin regardless of how much hose is required. Whenever less than seventy feet of the hose is required, the hose may be bent and kinked between the jetway and aircraft. A bent hose and/or kinked hose causes a reduction in airflow to the aircraft which, in turn, reduces the efficiency of the heating or cooling. In some cases, the aircraft cannot be adequately heated or cooled using air supplied by the jetway. Additionally, spreading the supply hose on the ramp causes safety problems and undue wear.

A need, therefore, exists for a device and a method for supplying conditioned air for heating and/or cooling to a commercial aircraft that may supply a hose of the appropriate length and that may retract the hose when the hose is no longer needed.

Further, while U.S. patent application Ser. No. 09/799,144 discloses a device and a method for supplying conditioned air for heating and/or cooling to a commercial aircraft or other object, the apparatus of the present invention has an improved hose and drive belt for improved manipulation of the hose. Further, the apparatus of the present invention has a retractor with a linear actuator that may provide for an easier operation for supplying and retracting the hose.

SUMMARY OF THE INVENTION

The present invention generally relates to a device and a method for supplying conditioned air for heating and cooling to an aircraft.

To this end, in an embodiment, an apparatus for providing conditioned air from a first environment to a second environment is provided. The apparatus has a housing, a flexible hose, a drive unit attached to the housing and a linear actuator connected to the drive unit. The housing has an interior defined by a first end and a second end. The flexible hose is in the interior of the housing. The inner tube is within the flexible hose and the inner tube supports the flexible hose.

In another embodiment, the apparatus further has a tube bracket attached to the first end of the housing wherein the tube bracket supports the inner tube.

In another embodiment, the apparatus further has a sensor attached to the inner tube for monitoring air In another embodiment, the drive unit has a belt and further wherein the belt has grooves that engage the flexible hose.

In another embodiment, the apparatus further has protrusions on the flexible hose wherein the protrusions correspond to grooves on the belt.

In another embodiment, the apparatus further has a motor attached to the drive unit.

In another embodiment, the apparatus further has a hose having protrusions wherein the hose extends between the inner tube and the housing.

In another embodiment, the apparatus further has a finger located between the inner tube and the drive unit wherein the finger guides the hose.

Moreover, in another embodiment of the present invention, an apparatus for retracting a hose is provided. The apparatus has a housing having an interior wherein the hose is in the housing, a drive unit on the housing and an actuator on the housing for retracting the drive unit. The drive unit has a belt and the belt has a plurality of grooves. Protrusions on the hose correspond to the plurality of grooves of the belt.

In another embodiment, the apparatus further has a guide on the housing for guiding the hose.

In another embodiment, the apparatus further has a motor attached to the housing wherein the motor powers the drive unit.

Moreover, in another embodiment of the present invention, a method for supplying conditioned air from a first environment to a second environment is provided. The method comprises the steps of: storing a hose having protrusions in a housing; providing a drive unit on the housing; providing a belt on the drive unit wherein the belt has grooves; engaging the hose with the belt wherein the grooves of the belt correspond to the protrusions of the hose; extracting the hose from the housing with the drive unit; attaching the housing to a source of conditioned air; and attaching the hose to the second environment.

In another embodiment, the method further comprises the step of monitoring air pressure in the hose.

In another embodiment, the method further comprises the step of releasing the hose from the second environment.

In another embodiment, the method further comprises the step of retracting the hose into the housing with the drive unit.

In another embodiment, the method further comprises the step of manually retracting the hose into the housing.

In another embodiment, the method further comprises the step of releasing the hose from the belt of the drive unit.

In another embodiment, the method further comprises the step of releasing the hose from the drive unit by retracting the drive unit with an actuator.

It is, therefore, an advantage of the present invention to provide an apparatus and a method for supplying conditioned air to an aircraft with a hose in a protected container.

Another advantage of the present invention is to provide an apparatus and a method with a hose in a protected container to reduce undue wear of the hose and maintenance performance of the hose.

Another advantage of the present invention is to provide an apparatus and a method where only the necessary amount of hose may be provided to supply an aircraft with conditioned air.

Still further, an advantage of the present invention is to provide an apparatus and a method that increases safety by storing unused portions of the hose in a container instead of spreading the unused hose on the ground.

Another advantage of the present invention is to provide an apparatus and a method for a wheel on the container such that the container and hose may be rotated to different positions and/or locations.

Another advantage of the present invention is to provide an apparatus and a method for positioning the housing with the hose in a vertical or horizontal position.

Another advantage of the present invention is to provide an apparatus and a method for a retractor that retracts the hose into or out from the housing.

Yet another advantage of the present invention is to provide an apparatus and a method for a linear actuator that retracts drive units to allow for manual manipulation of the hose.

Further, an advantage of the present invention is to provide an apparatus and a method for a belt having grooves equally spaced to fit around the ribs of the hose.

Still further, an advantage of the present invention is to provide an apparatus and a method for a belt having grooves equally spaced to fit around protrusions of the hose.

Additional features and advantages of the present invention are described in, and will be apparent from, the detailed description of the presently preferred embodiments and from the drawings.

BRIEF DESCRIPTION OF THE DRAWINGS

FIG. 6 illustrates a cross-sectional view of a retractor taken generally along line VI—VI of FIG. 5 in an embodiment of the present invention.

FIG. 7 illustrates a side view of a drive unit in an embodiment of the present invention.

FIG. 8 illustrates a side view of a belt and hose in an embodiment of the present invention.

DETAILED DESCRIPTION OF THE PRESENTLY PREFERRED EMBODIMENTS

The present invention generally relates to an apparatus and a method for retracting a hose and/or supplying conditioned air. More specifically, the present invention provides a supply hose in a protected container a retractor, and a linear actuator. The container may deliver the required length of hose for supplying conditioned air via drive units of the retractor. The drive units of the retractor may engage the hose and pull the hose from the container. In addition, the retractor may also retract the hose into the container when the hose is not needed. Further, the linear actuator may release the drive units from the hose for manual extraction and/or retraction of the hose.

Figure 1:
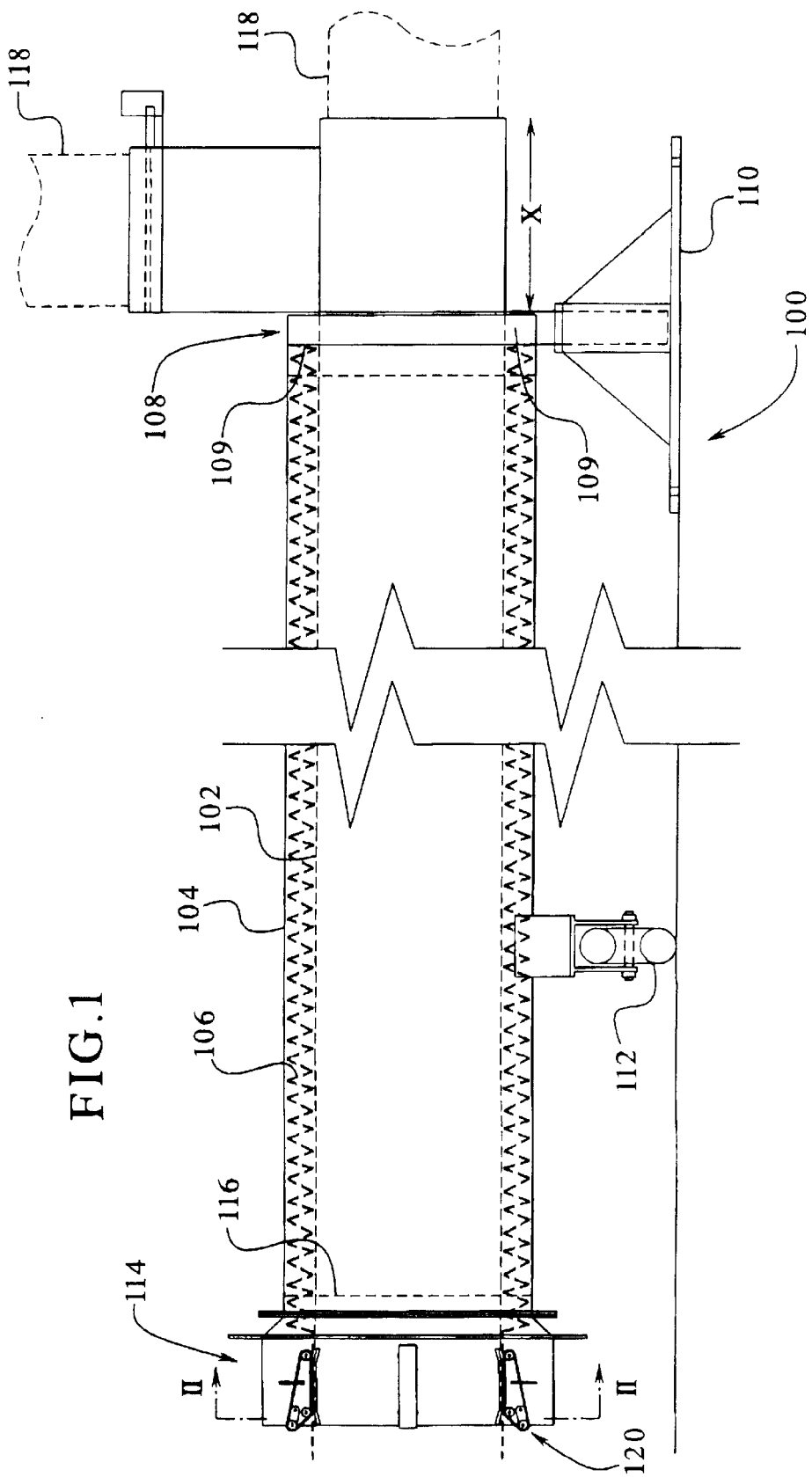
FIG. 1 illustrates a cross-sectional view of a device for supplying conditioned air to an aircraft.

Referring now to the drawings wherein like numerals refer to like parts, FIG. 1 generally illustrates a device 100 for supplying conditioned air to an aircraft. The device 100 may have an inner tube 102 within a housing 104, a flexible hose 106 and a retractor 114. The inner tube 102 may be constructed of metal, mylar, or any other like material that provides a smooth surface and sufficient strength to support a flexible hose 106. The housing 104 may have a first end 108 and a second end 116. The housing 104 may be cylindrical in shape and constructed of sheet metal, plastic or the like. The housing 104 may be supported by a base 110 at the first end 108 and by a tire 112 at a point near the second end 116.

Figure 4:
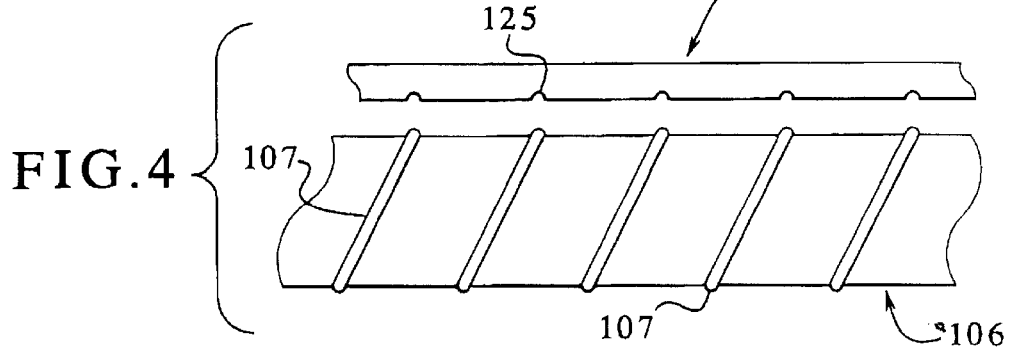
FIG. 4 illustrates a side view of a belt and hose in an embodiment of the present invention.

The flexible hose 106 is preferably seventy feet in length and may be stored within the housing 104 and surrounding the inner tube 102. The inner tube 102 may provide support for the flexible hose 106 and the inner tube 102 may supply conditioned air to the flexible hose 106 from a source, such as, for example, a jetway. The flexible hose 106 is generally known in the industry, such as a hose constructed by Flexfab®. A coil 107 may be integrally formed with the flexible hose 106 such that the flexible hose 106 may be compressed and/or expanded much like a spring may be compressed and/or expanded (as shown in FIG. 4). The flexible hose 106 may be compressed, for example, up to ⅙ of its length when the hose 106 is stored entirely in the device 100.

The first end 108 of the housing 104 may be attached to the base 110. The inner tube 102 may extend a distance "X" past the first end 108 of the housing 104. A starting end 109 of the flexible hose 106 may be located at the first end 108 of the housing 104. Alternatively, the starting end 109 of the flexible hose 106 may be located at the second end 116 of the housing 104.

The inner tube 102 may receive conditioned air, for example, from a source, such as, for example, a jetway (not shown). The inner tube 102 may be mounted directly to the source or may be connected to a relief hose 118 or other apparatus that delivers conditioned air from the source to the inner tube 102. The device 100 may be used in a horizontal position, or may be rotated to a vertical position and mounted to the source. Additionally, when in the horizontal position, the device 100 may be movable via the tire 112 such that the second end 116 may rotate about the first end 108 of the device 100. The retractor 114 may be attached to the second end 116 of the housing 104 and will be described in detail hereinafter.

Figure 2:
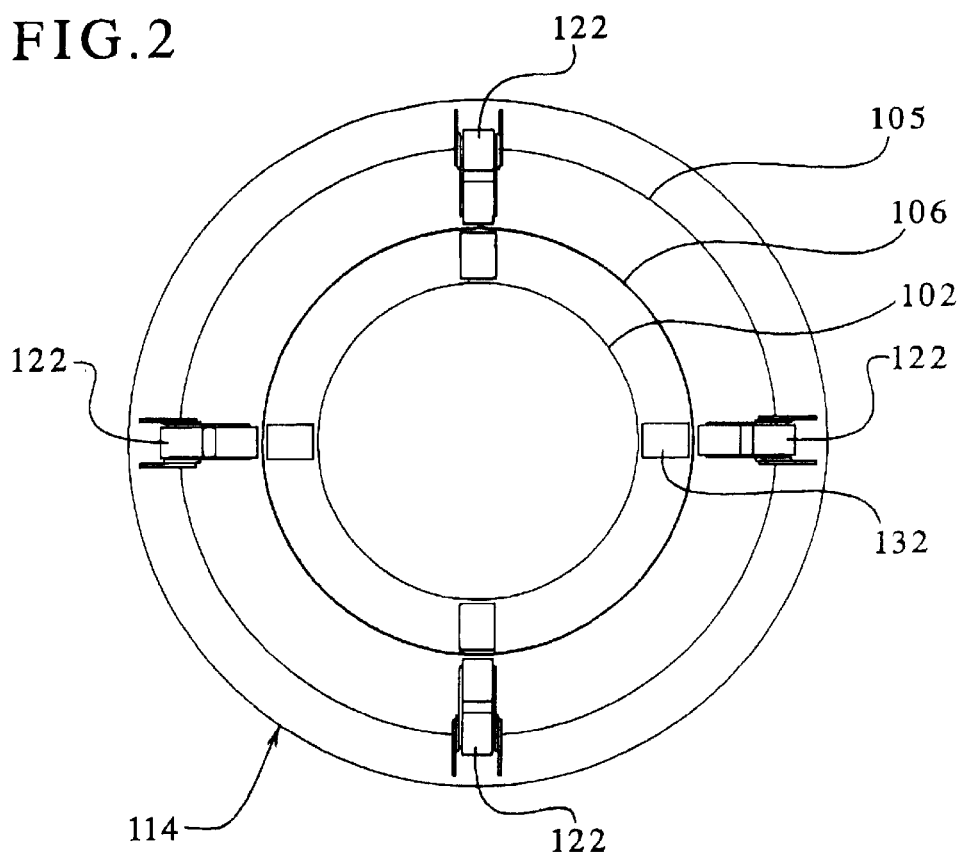
FIG. 2 illustrates a cross-sectional view of a retractor in an embodiment of the present invention.

Referring now to FIG. 2, a cross-sectional view of the retractor 114 is shown taken along lines II—II of FIG. 1. The retractor 114 may have four drive units 122 placed around the inner tube 102. Preferably, the drive units 122 are identical. Fingers 132 may be located between the inner tube 102 and the flexible hose 106. Further, the flexible hose 106 may be located between the fingers 132 and the drive units 122.

Figure 3:
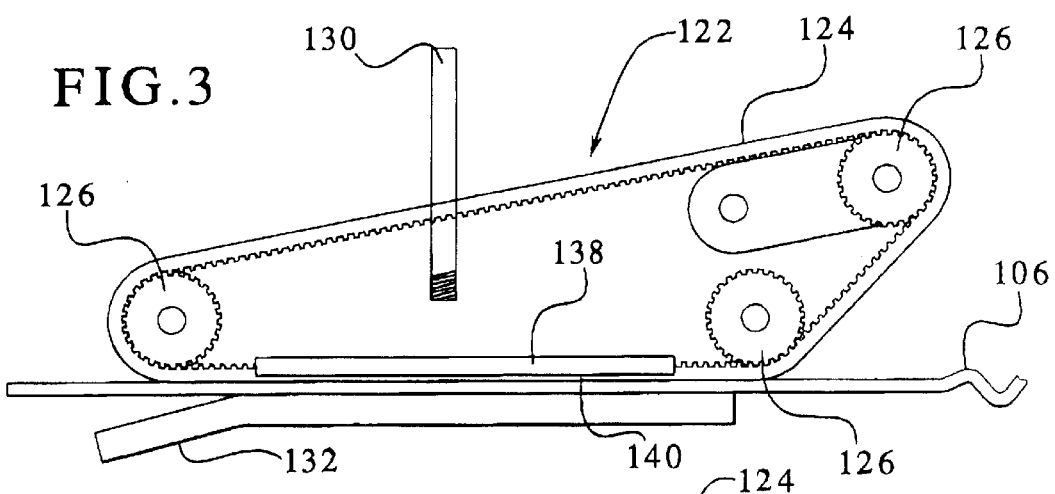
FIG. 3 illustrates a side view of a drive unit in an embodiment of the present invention.

The drive units 122, as shown in FIG. 3, may have a belt 124. Preferably, the belt 124, is constructed of rubber. The belt 124 may cover several cog rollers 126. One or all of the drive units 122 may be powered by a motor (not shown). Four adjustable springs 130, two on each side of the belt 124, may be used to provide tension on the belt 124. Additional rollers 136, or preferably, a plate 138, may be located between two cog rollers 126. The belt 124 may cover the cog rollers 126, and the plate 138 may cover the belt 124. The plate 138 may have a groove 140 in which the belt 124 may be covered. When in motion, the belt 124 may move in the groove 140. The plate 138 may serve to maintain the belt 124 in place. The drive units 122 may apply pressure to the flexible hose 106. The flexible hose 106 may be located between the belt 124 in the groove 140 of the plate 138 of the drive unit 122 and the fingers 132.

Referring again to FIG. 2, the fingers 132 may be located on the inner tube 102 and may extend from the second end of the inner tube 102 to a point outside of the retractor 114. The fingers 132 may be constructed of, for example, Teflon®, plastic, steel, or any like smooth material. The fingers 132 may guide the flexible hose 106 and may keep the flexible hose 106 from kinking. The fingers 132 may preferably be used when the device 100 is in a horizontal position and may not be necessary if the device 100 is implemented in a vertical position.

The cog rollers 126, powered by the motor of the drive unit 122, may propel the belt 124. The motor (not shown) may be hydraulic, electric, pneumatic or the like. Moreover, the drive units 122 may be powered by a single motor, or each drive unit 122 may be powered by a motor. The rotation of the belt 124 may propel the flexible hose 106 between the belt 124 and the fingers 132 onto the inner tube 102 of the device 100. Reversing the direction of the belt 124 may slide the flexible hose 106 out of the device 100. In addition, the device 100 may have a handle (not shown) that may release the pressure of the drive units 122 from the flexible hose 106 and may allow a person to manually pull the flexible hose 106 from the device 100.

Referring to FIG. 4, the flexible hose 106 may be integrally formed with a coil 107 to help support the flexible hose 106. Accordingly, the belt 124 may be manufactured with grooves 125 that may catch the coil 107 of the flexible hose 106 to allow for an easier pull of the flexible hose 106 through the retractor 114. Preferably, the grooves 125 are evenly spaced at a distance between adjacent grooves 125 to correspond to the coil 107 of the flexible hose 106.

An embodiment of the present invention may also incorporate the steps of a method for supplying conditioned air for heating and cooling to an aircraft. The flexible hose 106 may be pulled via a retractor 114 from the inner tube 102 and the housing 104. Alternatively, the flexible hose 106 may be pulled from the inner tub 102 and the housing 104 manually. By using a handle (not shown), a person may release the tension applied by the retractor 114 on the flexible hose 106 and then may manually pull the flexible hose 106 from the device 100. However, the device 100 may be designed to accept the flexible hose 106 for storage between the inner tube 102 and the housing 104 by use of the retractor 114.

The flexible hose 106 may be pulled from the device 100 to extend to its full length or a smaller length, whichever may be needed. The necessary length may be dependent on where a connector (not shown) on an aircraft (not shown) may be located and/or the distance of the aircraft form the source of conditioned air, such as a jetway. Some aircraft require seventy feet of flexible hose 106 while other aircraft require only twenty feet of flexible hose 106 for the source of conditioned air to reach the aircraft. Extracting only the necessary amount of the flexible hose 106 eliminates excess flexible hose 106 on the runway where the flexible hose 106 may bend. Bending of the flexible hose 106 affects the pressure of the conditioned air and/or subjects the flexible hose 106 to additional unnecessary wear and tear.

After the necessary amount of the flexible hose 106 is removed from the device 100, the unattached end of the flexible hose 106 may be attached to the connector of the aircraft. The inner tube 102 that extends to a point beyond the first end 108 of the housing 104 of the device 100 may be attached to a relief hose 118, or alternatively, may be mounted directly to the source (not shown).

After the flexible hose 106 is attached to the aircraft, and the device 100 is attached to the source of conditioned air, such as a jetway, (either directly or by a relief hose 118), conditioned air may then be supplied to the device 100. Conditioned air may be supplied to the inner tube 102 of the device 100 by either the relief hose 118 attached to the source or directly by the source. The conditioned air may be forced through the inner tube 102 towards the second end 116 of the housing 104.

After the conditioned air travels the length of the inner tube 102, the conditioned air may reach the flexible hose 106. The conditioned air may continue to travel through the flexible hose 106 to the aircraft. After the aircraft is supplied with the necessary amount of conditioned air, the flexible hose 106 may be removed from the aircraft and may be retracted into the device 100 for storage and/or subsequent use of the device 100.

Figure 5:
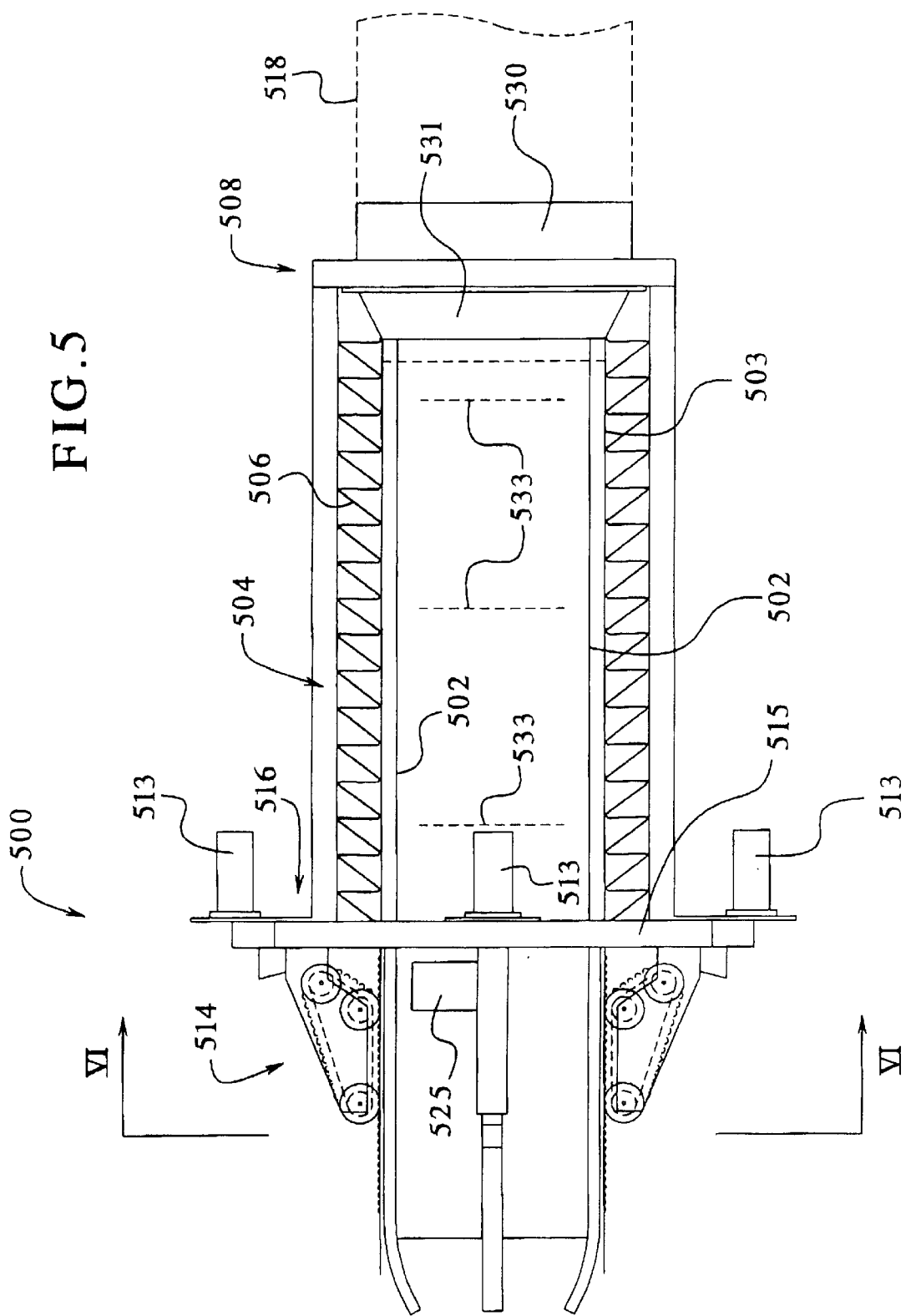
FIG. 5 illustrates a cross-sectional view of a device for retracting a hose and/or supplying conditioned air taken generally along line V—V of FIG. 6.

Referring now to FIG. 5, in another embodiment of the present invention, an apparatus 500 for supplying conditioned air to an aircraft is illustrated. The apparatus 500 may have an inner tube 502 within a housing 504, a flexible hose 506, a retractor 514 and a linear actuator 513. The inner tube 502 may be constructed of metal, polyester film, or any other like material that provides sufficient strength to support a flexible hose 506. The housing 504 may have a first end 508 and a second end 516. The housing 504 may be cylindrical in shape and constructed of sheet metal, plastic or the like. The inner tube 502 may support the flexible tube 502 inside the housing 504. The retractor 514 may have a drive unit 522 wherein the drive unit 522 may engage the flexible tube 506 and pull the flexible tube from the housing 504. The linear actuator 513 may pneumatically or hydraulically release the drive unit 522 from the flexible hose 506.

The flexible hose 506 may be stored within the housing 504 and surrounding the inner tube 502. The inner tube 502 may provide support for the flexible hose 506 and the inner tube 502 may supply conditioned air to the flexible hose 506 from a source, such as, for example, a jetway. The flexible hose 506 may be made from a high pressure silicone rubber tubing or any other material generally known in the industry, such as a hose constructed by Flexfab®. The inner tube 502 may be connected to a relief hose 518 or other source of conditioned air, at the first end 108 of the housing 104 by a tube support bracket 531.

The inner tube 502 may receive conditioned air, for example, from a source, such as, for example, a jetway (not shown). The inner tube 502 may be mounted directly to the source or may be connected to another apparatus that may deliver conditioned air from the source to the inner tube 502. The retractor 514 and the linear actuator 513 may be attached to the second end 516 of the housing 504 and will be described in detail hereinafter.

Referring now to FIG. 6, a cross-sectional view of the retractor 514 is generally shown taken along lines VI—VI of FIG. 5. The retractor 514 may have more than one drive unit 522 placed on the inner tube 502. Each additional drive unit 522 may located on the apparatus 500 equally spaced from one another. Fingers 532 may be located between the inner tube 502 and the flexible hose 506. Further, the flexible hose 506 may be located between the fingers 532 and the drive unit 522. The linear actuator 513 is located on a drive support bracket 515 and may retract the drive unit 522. The linear actuator 53 may retract the drive unit 522 by moving the drive unit 522 in a direction away from the flexible hose 506 such that the flexible hose 506 is disengaged from the drive unit 522. One linear actuator 513 may be used for each of the four drive unit 522. Alternatively, one linear actuator 513 may be connected to all drive unit 522 such that the one linear actuator 513 may be used for all of the four drive units 522.

Referring to FIG. 7, the drive unit 522 may have a belt 524. Preferably, the belt 524 may be constructed from rubber. A slide 538, may be located between two cog rollers 526. The belt 524 may have grooves 527 hat fit into teeth 509 integrally formed with the cog rollers 526. A slide 538 between two of the cog rollers 526, may guide the belt 524. The slide 538 may serve to maintain the belt 524 in place. The belt 524 of the drive unit 522 may apply pressure to the flexible hose 506. The flexible hose 506 may be located between the belt 524 of the drive unit 522 and the fingers 532.

The cog rollers 526 may be powered by a motor 525 of the drive unit 522 and may turn the cog rollers 526 which in turn may rotate the belt 524 as shown in FIG. 5. The rotation of the belt 524 may propel the flexible hose 506 between the belt 524 and fingers 132 onto the inner tube 502 of the apparatus 500. Reversing the direction of the belt 524 may slide the flexible hose 506 back onto the inner tube 502 of the apparatus 500. In addition, the linear actuator 503 may retract the drive unit 522. The retracted drive unit 522 may disengage the flexible hose 506 for manual extraction of the flexible hose 506. The drive unit 522 may be powered by a motor 525 as shown in FIG. 5.

Referring to FIG. 8, the flexible hose 506 may be integrally formed with protrusions 507. The belt 524 may be manufactured with grooves 527. The grooves 527 are spaced at a distance between adjacent grooves 527 to correspond to the protrusions 507 of the flexible hose 506. Accordingly the grooves 527 of the belt 524 may catch the protrusions 507 of the flexible hose 506. The grooves 527 on the belt 524 and the protrusions 507 on the hose 506 may allow for an easier pull of the flexible hose 506 through the retractor 514.

To use the apparatus 500, the flexible hose 506 may be pulled via the drive unit 522 of the retractor 514 from the inner tube 502 and the housing 504. Alternatively, the linear actuator 513 may retract the drive unit 522 and the flexible hose 506 may be manually pulled from the inner tub 502 and the housing 504. After a desired length of the flexible hose 506 is removed from the apparatus 500, the unattached end of the flexible hose 506 may be attached to the aircraft or other object for receiving conditioned air. After the aircraft is supplied with the necessary amount of conditioned air, the flexible hose 506 may be removed from the aircraft and may be retracted into the apparatus 500 for storage and/or subsequent use of the apparatus 500.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An apparatus for providing conditioned air from a first environment to a second environment, the apparatus comprising:

a housing defining an interior wherein the housing has a first end and a second end;

a flexible hose within the interior of the housing;

an inner tube in the housing wherein the inner tube is within the flexible hose and further wherein the inner tube supports the flexible hose;

a drive unit attached to the housing; and a linear actuator connected to the drive unit.

2. The apparatus of claim 1 further comprising:

a tube bracket attached to the first end of the housing wherein the tube bracket supports the inner tube.

3. The apparatus of claim 1 further comprising:

a sensor attached to the inner tube for monitoring air pressure in the inner tube.

4. The apparatus of claim 1 wherein the drive unit has a belt and further wherein the belt has grooves that engage the flexible hose.

5. The apparatus of claim 4 further comprising:

protrusions on the flexible hose wherein the protrusions correspond to grooves on the belt.

6. The apparatus of claim 1 further comprising:

a motor attached to the drive unit.

7. The apparatus of claim 1 further comprising:

a hose having protrusions wherein the hose extends between the inner tube and the housing.

8. The apparatus of claim 1 further comprising:

a finger located between the inner tube and the drive unit wherein the finger guides the hose.

* * * * *